United States Patent [19]
Holsted

[11] Patent Number: 5,176,465
[45] Date of Patent: Jan. 5, 1993

[54] DEVICE FOR INTERLOCKING SEPARATE COMPONENT HOUSING STRUCTURES

[76] Inventor: Carl A. Holsted, 15722 - 121st SE., Renton, Wash. 98058

[21] Appl. No.: 572,394

[22] Filed: Aug. 27, 1990

[51] Int. Cl.⁵ .............................................. F16D 1/00
[52] U.S. Cl. .................................. 403/407.1; 403/361; 248/346; 108/56.3
[58] Field of Search ................ 403/407.1, 361, 379; 211/194, 52; 248/346, 677, 678, 649; 108/56.3, 53.3, 53.5, 901, 52.1, 91, 56.3

[56] References Cited

U.S. PATENT DOCUMENTS

| | | | |
|---|---|---|---|
| 1,346,299 | 7/1920 | Cooper | 403/379 X |
| 2,560,659 | 7/1951 | Payeur | 108/150 X |
| 3,438,342 | 4/1969 | Woolworth et al. | 108/56.3 |
| 3,482,809 | 12/1969 | McCall, Jr. | 248/346 X |
| 3,664,271 | 5/1972 | Wolder et al. | 108/901 X |
| 4,898,493 | 2/1990 | Blaukenberg | 403/407.1 |

*Primary Examiner*—Andrew V. Kundrat

[57] ABSTRACT

Device (10) for holding together adjoining component housings arranged in a vertical stack, said device (10) comprising a first female section (12) and a second male section (14) wherein the female member is provided with a cavity (22) to receive a male plug member (32). Each of the male and female members has a base (16,30) from which the coacting parts extend. The members (12, 14) are provided with aligned holes (29,34) through which a locking means (38) may be inserted for holding the members together. The base of each of the members is provided with an adhesive means (26,36) for adhering the member to a component housing surface.

2 Claims, 1 Drawing Sheet

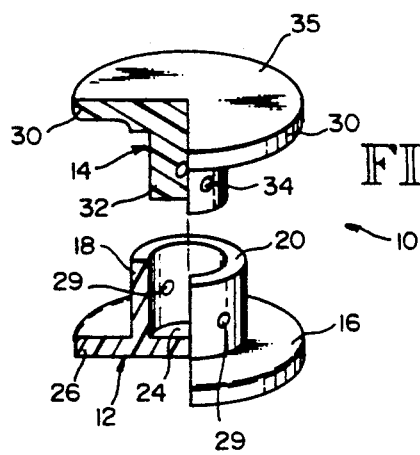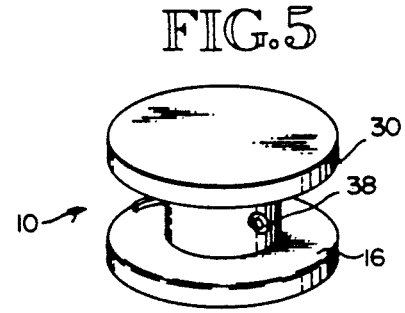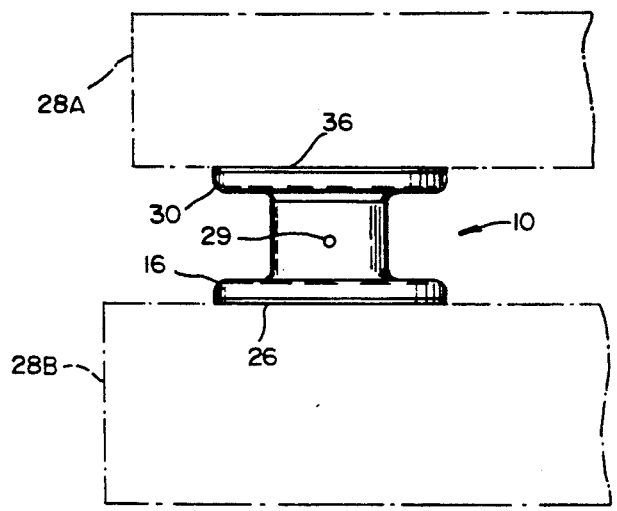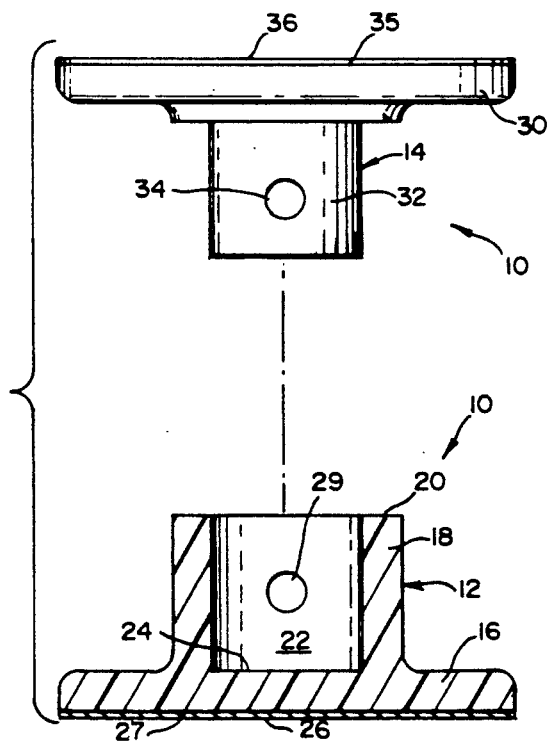

DEVICE FOR INTERLOCKING SEPARATE COMPONENT HOUSING STRUCTURES

DESCRIPTION

1. Technical Field

The invention relates to the field for interlocking and coupling together separate structures and more particularly to a device for detachably and securely stacking separate items of furniture, stereo systems and computer peripherals and other equipment.

2. Background Art

Most people are aware of the occasional need in their houses for arranging multiple piece systems in vertical stacks. Such need extends to, for example, multiple housing parts for audio and video homed entertainment systems, and for computer peripherals. It has been recognized that means are desirable for arranging discrete parts in a vertical stack to save space, to present a more esthetics appearance and for convenience to the owner. In this way they can be linked together so that they do not slide or shift with respect to each other. In short the need is for securing the vertical arrangement so that is is not easily misaligned.

Among the known prior art are several patented systems which are concerned with much the same kind of problem(s) but which in structural and functional principles are clearly different and distinct from the instant system.

Cohen, U.S. Pat. No. 4,846,435, shows a rail system which is directed to supporting discrete parts of different housing lengths. FIG. 8 thereof is directed to details of the interrelated parts which are not pertinent to the instant system.

U.S. Pat. No. 4,691,891 teaches a system for preventing unauthorized removal or separation of a component from its support structure. It uses adhesive material on the underside of the component between support and component.

U.S. Pat. No. 4,519,656 discloses an attachement for securing a cabinet to the cover of a bathroom flush tank.

U.S. Pat. No. 4,293,072 shows a means for stacking containers which involves hooks engaging the underside of lips to hold the containers together.

U.S. Pat. No. 4,155,452 discloses corner devices which allow stacking of component housings in interlocking relationship without fear of lateral displacement of one housing with respect to another.

U.S. Pat. No. 4,025,015 teaches separable plug and socket adapters for mounting one component to another. Reference here is made to FIGS. 3 and 6 showing upper and lower members having adhesive means for their attachment to a mounting surface.

None of the above patents anticipates the instant invention. Other prior art references of possible interest are U.S. Pat. Nos. 3,053,558; 4,213,352; 3,000,680 and 1,254,636.

DISCLOSURE OF THE INVENTION

The device of this invention comprises two coacting parts which detachably interlock. A male plug member is secured by adhesive to an upper component and a female member is secured to a separate lower component so that the two, when aligned, interlock. The structural details are such that the two may be locked together if desired.

Accordingly, it is among the features of the invention to provide a device which not only prevents lateral movement, shifting or sliding of stacked pieces of equipment but also spaces the component housings one from the other to allow easier air circulation and cooling. Slippage is prevented from vibration, sudden impact, pets accidentally running into the equipment and from earth tremors. Furthermore, installation is simple and quick and the interlocking is such that theft of the equipment can be made difficult if not impossible by employing locking cables or long shank padlock links. The invention can be used not only for stackable, discrete housings for electronic components like stereos and computer peripherals but also for medical, scientific, industrial, aerospace and laboratory equipment. The device is simple, rugged and inexpensive to make.

BRIEF DESCRIPTION OF THE DRAWINGS

FIG. 1 is an exploded perspective view of both parts of the device with a section cut away to show details of construction;

FIG. 2 is a side elevation view showing the device joined in interlocking arrangement between two hosing components;

FIG. 3 is a side elevation view showing the parts separated;

FIG. 4 is an exploded view with one part in cross section showing additional details of the structure; and FIG. 5 is a view in perspective showing a simple cotter key inserted through the aligned holes to lock the two parts together.

BEST MODE FOR CARRYING OUT THE INVENTION

The invention, generally designated by the number 10, is comprised of two parts, namely a female portion generally designated by the number 12 and a male member generally designated by the number 14.

Female portion 12 is shaped to have a generally flat, round base wall section 16 and an upstanding cylindrical wall section 18 preferably integrally formed with base 16 as best seen in FIGS. 1 and 4. Wall section 18 has upper edge 20 and defines a cavity 22 having a cavity bottom surface 24. The bottom surface 27 of base 16 is provided with adhesive material 26 in the form, as an example, of a double back foam tape or other type of bonding tape. However, it is to be understood that a mechanical fastening device may be used for securing male and female parts to a component housing, such as by use of screws, pins or the like. Thus, the female member 12 can be attached to the upper or lower surface of a component housing 28A or B as seen in FIG. 2 in phantom.

The male member 14 also has a flat round base wall 30 with outwardly extending plug portion 32 which may be solid as shown or cylindrical like the female member. The male plug 32 is provided with hole or holes (if cylindrical) 34 which align with holes 29 in the female member. It will be seen that planar surface 35 of base 30 of the male member is provided with double foam tape 36 or equivalent adhesive material. It will be appreciated that a rubber or felt pad 40 may be attached to the bottom surface of a male member so that if a component is lifted free of the female member it can be set on a sensitive surface without marring the same.

When male plug 32 is inserted into cavity 22 of the female member a cotter pin 38 or other insertable means may be used to lock the two parts of the invention together. It will be appreciated that a cable, or a combination or key type padlock with a long shank pivotal link could be used in the aligned holes for the purposes of thwarting theft. Both members 12 and 14 are preferably formed of injection molded plastic but could also be made of metal if desired. While description of the invention has used the term 'planar' for the surface which attaches to a component housing, it is to be realized that the attaching surface will be designed to conform with the surface configuration of the housing which in the vast majority of uses will be a planar surface.

I claim:

1. A mounting and spacing means for inserting between adjoining individual, vertically stackable housing components, comprising:
   a) a first detachable female member having a base portion which includes a housing contact surface adapted to be provided with means for attaching said housing contact surface to the surface of a housing, said female member including an upstanding cylindrical wall on the opposite side of said base portion from said housing contact surface, said upstanding wall being of predetermined height, diameter and thickness to define a cavity therein,
   b) a second detachable male member having a base portion also including a housing contact surface adapted to be provided with means for attaching said housing contact surface to the surface of a housing, said male member including an outstanding plug section on the base thereof opposite said housing contact surface and being sized to be received in said cavity of said female member and marr prevention means on the bottom surface of the plug section, and
   c) transverse hole means in each of said female upstanding wall and in said male plug portion such that when said plug is inserted in said cavity said holes may be aligned for insertion of locking means to detachably hold said first female and second male members together and thereby lock adjacent housing components together.

2. A mounting and spacing means for inserting between adjoining individual, vertically stackable housing components, comprising:
   a) a first detachable female member having a base portion which includes a housing contact surface adapted to be provided with adhesive material for adhering said housing contact surface to the surface of a housing, said female member including an upstanding cylindrical wall on the opposite side of said base portion from said housing contact surface, said upstanding wall being of predetermined height, diameter and thickness to define a cavity therein,
   b) a second detachable male member having a base portion also including a housing contact surface adapted to be provided with adhesive material for adhering said housing contact surface to the surface of a housing, said male member including an outstanding plug section on the base thereof opposite said housing contact mounting surface and being sized to be received in said cavity of said female member and marr prevention means on the bottom surface of the plug section, and
   c) transverse hole means in each of said female upstanding wall and in said male plug portion such that when said plug is inserted in said cavity said holes may be aligned for insertion of locking means to detachably hold said first female and second male members together and thereby lock adjacent housing components together.

* * * * *